US012688039B2

(12) United States Patent
Sun et al.

(10) Patent No.: US 12,688,039 B2
(45) Date of Patent: Jul. 21, 2026

(54) IMPLEMENTATION AND INTERPRETATION OF API ROUTING DOMAIN-SPECIFIC LANGUAGE

(71) Applicant: KONG INC., San Francisco, CA (US)

(72) Inventors: Datong Sun, Shanghai (CN); Chrono Luo, Shanghai (CN)

(73) Assignee: KONG INC., San Francisco, CA (US)

( * ) Notice: Subject to any disclaimer, the term of this patent is extended or adjusted under 35 U.S.C. 154(b) by 897 days.

(21) Appl. No.: 18/051,388

(22) Filed: Oct. 31, 2022

(65) Prior Publication Data

US 2024/0143323 A1     May 2, 2024

(51) Int. Cl.
 *G06F 9/30* (2018.01)
 *G06F 9/54* (2006.01)
(52) U.S. Cl.
 CPC ........ *G06F 9/30029* (2013.01); *G06F 9/3017* (2013.01); *G06F 9/541* (2013.01); *G06F 9/547* (2013.01)
(58) Field of Classification Search
 CPC .... G06F 9/30029; G06F 9/3017; G06F 9/541; G06F 9/547; H04L 67/10
 See application file for complete search history.

(56) References Cited

U.S. PATENT DOCUMENTS

| | | | | |
|---|---|---|---|---|
| 10,929,396 | B1 * | 2/2021 | Bhatia ..................... | G06F 16/93 |
| 2007/0283023 | A1 * | 12/2007 | Ly ........................... | H04L 67/56 |
| | | | | 709/227 |
| 2015/0331729 | A1 * | 11/2015 | Kurokawa ............. | G06F 9/547 |
| | | | | 709/203 |
| 2017/0012941 | A1 * | 1/2017 | Subbarayan ............ | H04L 67/10 |
| 2020/0053025 | A1 * | 2/2020 | Evans ..................... | H04L 69/22 |
| 2020/0250013 | A1 * | 8/2020 | Boran ................. | H04L 65/1033 |
| 2021/0112059 | A1 * | 4/2021 | Heldman ............ | H04L 63/0807 |
| 2022/0083407 | A1 * | 3/2022 | Nadendla .............. | G06F 9/5011 |
| 2022/0283882 | A1 * | 9/2022 | Singh ........................ | G06F 8/60 |

* cited by examiner

*Primary Examiner* — Kevin L Young
*Assistant Examiner* — Phuong N Hoang
(74) *Attorney, Agent, or Firm* — Perkins Coie LLP; Colin Fowler

(57) ABSTRACT

Disclosed embodiments relate to implementation and interpretation of an application programming interface (API) routing domain-specific programming language (DSL). The API routing DSL improves storage efficiency of routing definitions and rules, reduces errors for API messages unmatched to routes, and improves runtime performance for API message routing. In example embodiments, a routing data object configured according to the API routing DSL includes a match expression. The match expression is a logical combination of one or more attribute condition statements that each describe a relational comparison between an API message attribute and a specified value. Evaluation of the match expression as logically true using attributes of a given API message indicates that the given API messages matches the routing data object. The given API message is then routed according to an endpoint and/or policies associated with the routing data object.

24 Claims, 9 Drawing Sheets

START

Receive an API message
602

Access routing data objects configured according to DSL
604

Perform at least one matching operation between API message and routing data objects
606

Identify a particular routing data object that matches the API message
608

Route the API message
610

END

```
curl --request POST \
   --url http://localhost:8001/services/example-service/routes \
   --form expression='http.path == "/mock"'
```

FIG. 5A

```
curl --request POST \
   --url http://localhost:8001/services/example-service/routes \
   --header 'Content-Type: multipart/form-data' \
   --form name=complex_object \
   --form 'expression=(net.protocol == "http" || net.protocol == "https") &&
          (http.method == "GET" || http.method == "POST") &&
          (http.host == "example.com" || http.host == "example.test") &&
          (http.path == "/mock" || http.path == "/mocklog") &&
          http.headers.x_another_header == "example_header" && (http.headers.x_my_header == "example" || http.headers.x_my_header == "example1")'
```

FIG. 5B

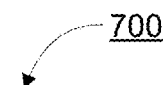
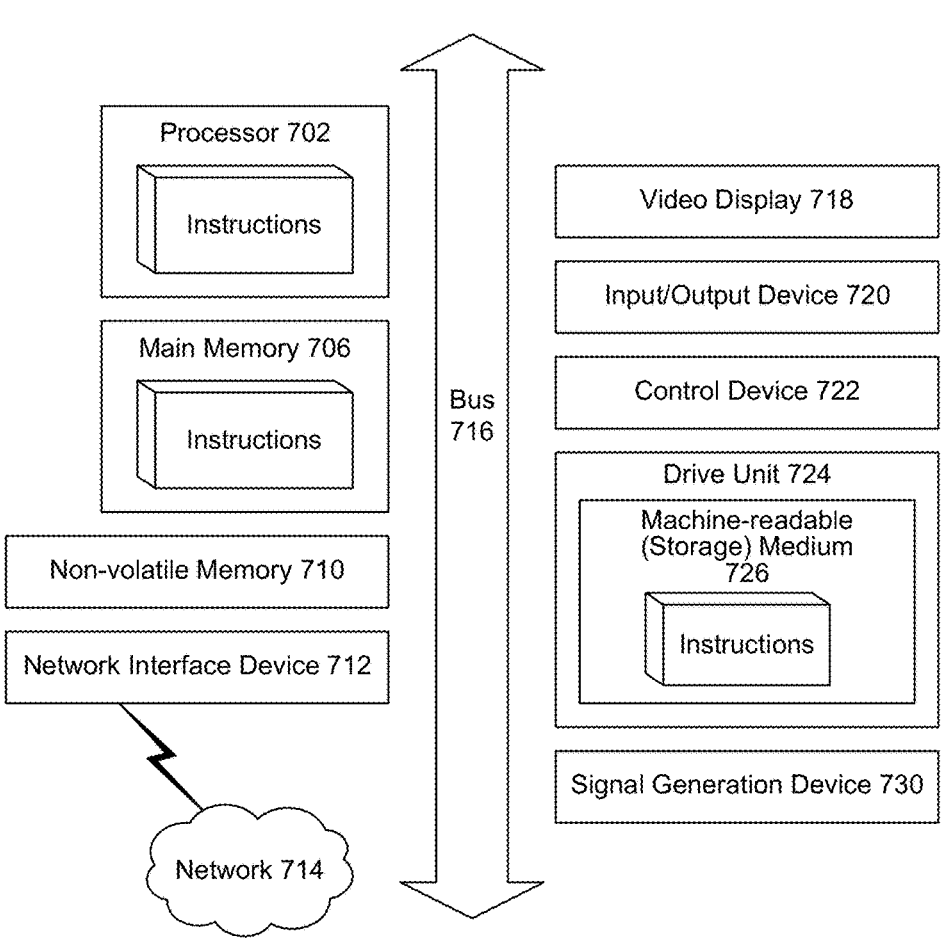
*FIG. 7*

IMPLEMENTATION AND INTERPRETATION OF API ROUTING DOMAIN-SPECIFIC LANGUAGE

BACKGROUND

Application programming interfaces (APIs) primarily enable communication between different software components. For example, APIs can include specifications for clearly defined routines, data structures, object classes, and variables used at a relevant software component (e.g., a microservice application). Thus, an API defines what information is available and how to send or receive that information.

Microservices are a software development technique—a variant of the service-oriented architecture (SOA) architectural style that structures an application as a collection of loosely coupled services (embodied in APIs). In a microservices architecture, services are fine-grained, and the protocols are lightweight. The benefit of decomposing an application into different smaller services is that it improves modularity. This makes the application easier to understand, develop, test, and become more resilient to architecture erosion. Microservices parallelize development by enabling small autonomous teams to develop, deploy and scale their respective services independently. Microservice-based architectures enable continuous delivery and deployment.

BRIEF DESCRIPTION OF THE DRAWINGS

FIGS. 5A and 5B each illustrate an example of a routing data object according to which a gateway routes API messages to and from APIs, according to an embodiment of the disclosed technology.

FIG. 7 depicts a diagrammatic representation of a machine in the example form of a computer system within a set of instructions, causing the machine to perform any one or more of the methodologies discussed herein, to be executed.

DETAILED DESCRIPTION

Figure 1A:
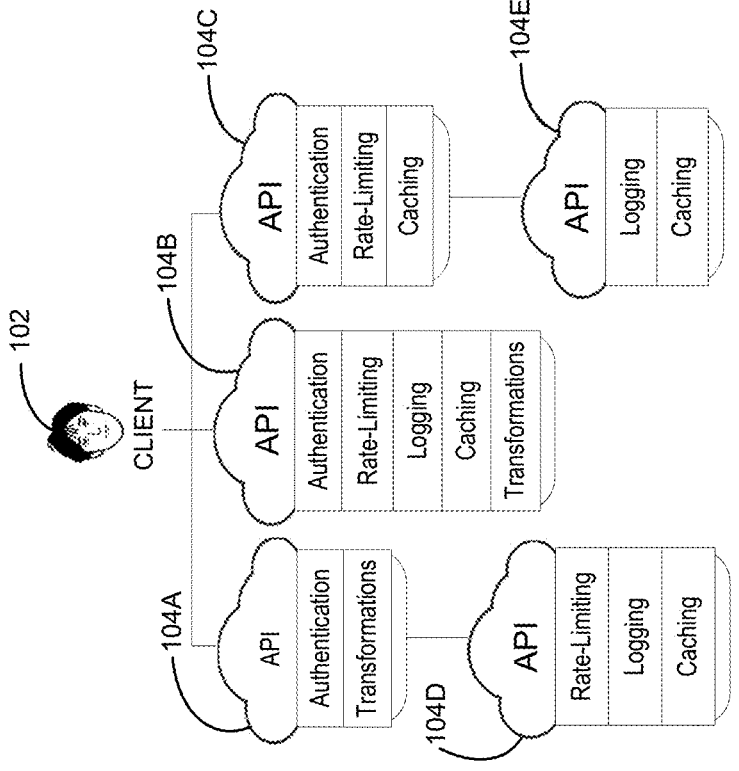
FIG. 1A illustrates a diagram of multiple APIs having functionalities common to one another.

The disclosed technology describes example embodiments of a domain-specific programming language that are implemented, interpreted, and used to route messages (e.g., API requests, API responses) within a distributed microservices network, a distributed computing platform, a service-oriented system, and/or the like. Example embodiments enable storage-efficient, flexible, and versatile routing of API messages. In particular, some example embodiments disclosed herein relate to an API routing domain-specific programming language, and implementation of said language to define and interpret routes for API messages. Thus, embodiments disclosed herein improve upon the technical benefits of API routing for a distributed network, platform, or system.

In particular, routing refers to a core tenet of a microservice architecture, where external clients invoke certain microservices indirectly via a gateway and/or an exposed node of the microservice architecture. For example, an external client transmits an API request that identifies a particular microservice, service, application, and/or the like. The API request is received by a gateway and/or an exposed node, which then forwards the API request to the identified microservice, service, application, and/or the like. By configuring various different routes that point to a particular microservice, for example, different requests forwarded along the different routes can be discriminatively handled. As an example, different routes are managed by different rate limiting policies, permission policies, authentication policies, and/or the like. Thus, routing provides an additional layer of control, security, and other technical benefits.

According to embodiments disclosed herein, routing generally involves evaluating API message attributes, characteristics, fields, properties, and/or the like with respect to various routing rules to determine a particular route for routing a given API message. In existing implementations, routing rules that match API messages to routes are rigidly defined, leading to large volumes of individually-defined routes with small scope. In such existing implementations, complete routing is realized based on domain knowledge and manual planning by a user to cover every possible API message.

The disclosed technology addresses at least these technical challenges. A routing domain-specific language (DSL) is implemented and used to efficiently define multiple routes in a reduced number of expressions and/or statements of routing rules. Further, routing rules configured according to the routing DSL are more efficiently interpreted at runtime, so the actual routing of API messages is improved.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Example Microservice and Gateway Architectures

Embodiments of the present disclosure are applicable to systems, platforms, and architectures of microservices APIs, and to communications therewithin. As indicated, embodiments improve routing of messages between, to, and from APIs that are distributed across said systems, platforms, and architectures.

Example microservice API architectures are described herein. In some examples, the architecture includes a distributed cluster of gateway nodes that jointly provide access to the APIs for external clients. In some examples, the APIs are provided by providing a plurality of plugins that implement the APIs. As a result of a distributed architecture, the task of API management can be distributed across a cluster of gateway nodes or even web services. For example, some APIs that make up the microservices application architecture may run on Amazon AWS®, whereas others may operate on Microsoft Azure®. It is feasible that the same API may run multiple instances (e.g., multiple workers) on both AWS and Azure (or any other suitable web hosting service).

The gateway nodes effectively become the entry point for API-related requests from users, and the exit point for API responses to users. Requests that operate in between APIs (e.g., where one API communicates to another API) may have architecturally direct communication, though indicate communications/request response transactions to a control plane via data plane proxies. In some embodiments, inter-API requests may pass through a gateway depending on network topology, API configuration, or stewardship of an associated API. The disclosed embodiments are well-suited for use in mission critical deployments at small and large organizations. Aspects of the disclosed technology do not impose any limitation on the type of APIs. For example, these APIs can be proprietary APIs, publicly available APIs, or invite-only APIs.

FIG. 1A illustrates an example implementation with multiple APIs having functionalities common to one another. As shown in FIG. 1A, a client 102 is associated with APIs 104A, 104B, 104C, 104D, and 104E. Each API has a standard set of features or functionalities associated with it. For example, the standard set of functionalities associated with API 104A are "authentication" and "transformations."

The standard set of functionalities associated with API 104B are "authentication," "rate-limiting," "logging," "caching," and "transformations." Thus, "authentication" and "transformations" are functionalities that are common to APIs 104A and 104B. Similarly, several other APIs in FIG. 1A share common functionalities. However, it is noted that having each API handle its own functionalities individually causes duplication of efforts and code associated with these functionalities, which is inefficient. This problem becomes significantly more challenging when there are tens of thousands of APIs and millions of clients requesting API-related services per day.

Figure 1B:
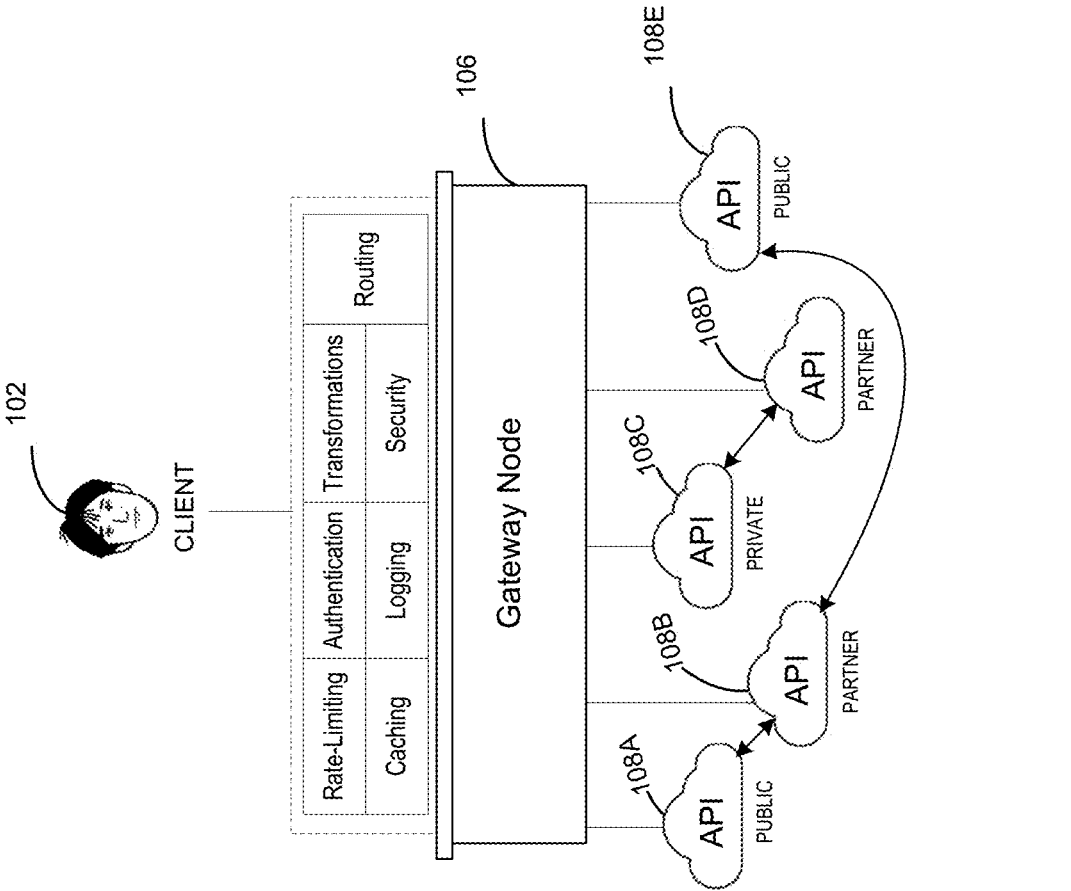
FIG. 1B illustrates a distributed API gateway architecture, according to an embodiment of the disclosed technology.

FIG. 1B illustrates a distributed API gateway architecture according to an embodiment of the disclosed technology. To address the challenge described in connection with FIG. 1A, the disclosed technology provides a distributed API gateway architecture as shown in FIG. 1B. Specifically, disclosed embodiments implement common API functionalities by bundling the common API functionalities into a gateway node 106 (also referred to herein as an API Gateway). Gateway node 106 implements common functionalities as a core set of functionalities that runs in front of APIs 108A, 108B, 108C, 108D, and 108E. The core set of functionalities include rate limiting, caching, authentication, logging, transformations, and security. It will be understood that the above-mentioned core set of functionalities are for examples and illustrations. In some applications, gateway node 106 can help launch large-scale deployments in a very short time at reduced complexity and is therefore an inexpensive replacement for expensive proprietary API management systems. The disclosed technology includes a distributed architecture of gateway nodes with each gateway node bundled with a set of functionalities that can be extended depending on the use-case or applications.

In serving as an exposed point-of-entry and point-of-exit between a client 102 and various APIs 108, the gateway node 106 is configured with routing functionality. Because client messages are not directly received at a destination API but instead at the gateway node 106, the client messages need to be routed to the destination API by and from the gateway node 106. Accordingly, the gateway node 106 is configured to perform various routing-related operation herein to forward API requests by a client 102 to particular APIs 108 and to pass API responses back to the client 102.

As discussed, the gateway node 106 is able to realize various common functionalities as illustrated due to the routing functionality. In particular, the common functionalities can be differentially, discriminatively, and/or selectively applied on different routes. For example, API requests along a first route to API 108C are rate-limited to a first extent by the gateway node 106, while API requests along a second route to API 108C are rate-limited to a second extent by the gateway node 106. As another example, different security and authentication checks are performed on different routes. Thus, the gateway node 106 embodies an intelligent and versatile layer of control and security for the architecture.

According to example embodiments, the gateway node 106 generally manages and accesses routing data objects that define routes and that correspond to APIs in the architecture. The gateway node 106 compares a given API request to the routing data objects to find a particular routing data object that matches the given API request. The gateway node 106 then forwards the given API request along the route defined by the particular routing data object, for example, to a particular API corresponding to the particular routing data object.

Figure 2:
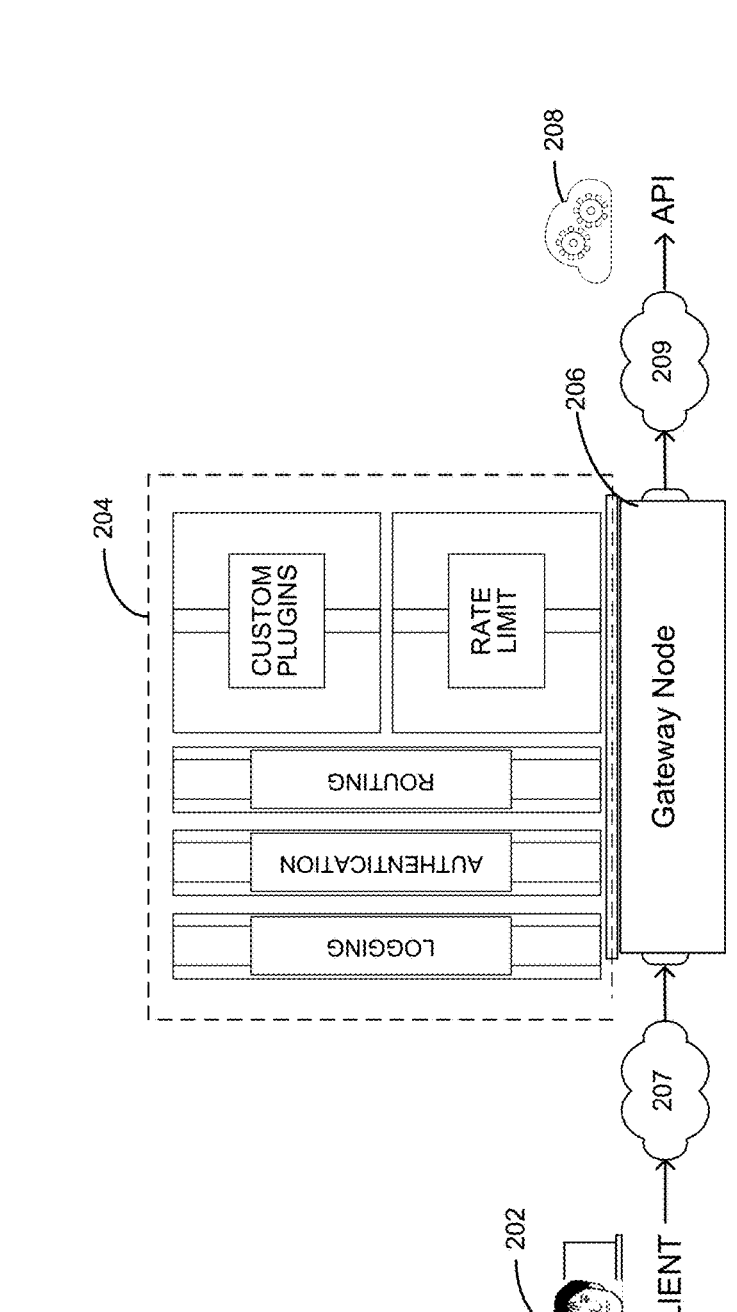
FIG. 2 illustrates a block diagram of an example environment suitable for functionalities provided by a gateway node, according to an embodiment of the disclosed technology.

FIG. 2 illustrates a block diagram of an example environment suitable for functionalities provided by a gateway node according to an embodiment of the disclosed technology. In some embodiments, a core set of functionalities are provided in the form of "plugins" or "add-ons" installed at a gateway node. (Generally, a plugin is a component that allows modification of what a system can do usually without forcing a redesign/compile of the system. When an application supports plug-ins, it enables customization. The common examples are the plug-ins used in web browsers to add new features such as search-engines, virus scanners, or the ability to utilize a new file type such as a new video format.)

As an example, a set of plugins 204 shown in FIG. 2 are provided by gateway node 206 positioned between a client 202 and one or more HTTP APIs. Electronic devices operated by client 202 can include, but are not limited to, a server desktop, a desktop computer, a computer cluster, a mobile computing device such as a notebook, a laptop computer, a handheld computer, a mobile phone, a smart phone, a PDA, and/or an iPhone or Droid device, etc. Gateway node 206 and client 202 are configured to communicate with each other via network 207. Gateway node 206 and one or more APIs 208 are configured to communicate with each other via network 209. In some embodiments, the one or more APIs reside in one or more API servers, API data stores, or one or more API hubs. Various combinations of configurations are possible.

Networks 207 and 209 can be any collection of distinct networks operating wholly or partially in conjunction to provide connectivity to/from client 202 and one or more APIs 208. In one embodiment, network communications can be achieved by, an open network, such as the Internet, or a private network, such as an intranet and/or the extranet. Networks 207 and 209 can be a telephonic network, an open network, such as the Internet, or a private network, such as an intranet and/or the extranet. For example, the Internet can provide file transfer, remote login, email, news, RSS, and other services through any known or convenient protocol, such as, but not limited to the TCP/IP protocol, Open System Interconnections (OSI), FTP, UPnP, iSCSI, NSF, ISDN, PDH, RS-232, SDH, SONET, etc.

Client 202 and one or more APIs 208 can be coupled to the network 150 (e.g., Internet) via a dial-up connection, a digital subscriber loop (DSL, ADSL), cable modem, wireless connections, and/or other types of connection. Thus, the client devices 102A-N, 112A-N, and 122A-N can communicate with remote servers (e.g., API servers 130A-N, hub servers, mail servers, instant messaging servers, etc.) that provide access to user interfaces of the World Wide Web via a web browser, for example.

The set of plugins 204 include authentication, logging, routing, rate-limiting, and custom plugins, of which authentication, logging, routing, traffic control, rate-limiting can be considered as the core set of functionalities. An authentication functionality can allow an authentication plugin to check for valid login credentials such as usernames and passwords. A logging functionality of a logging plugin logs data associated with requests and responses. A traffic control functionality of a traffic control plugin manages, throttles, and restricts inbound and outbound API traffic. A rate limiting functionality can allow managing, throttling, and restricting inbound and outbound API traffic. For example, a rate limiting plugin can determine how many HTTP requests a developer can make in a given period of seconds, minutes, hours, days, months or years.

A plugin can be regarded as a piece of stand-alone code. After a plugin is installed at a gateway node, it is available to be used. For example, gateway node 206 can execute a plugin in between an API-related request and providing an associated response to the API-related request. One advantage of the disclosed system is that the system can be expanded by adding new plugins. In some embodiments, gateway node 206 can expand the core set of functionalities by providing custom plugins. Custom plugins can be provided by the entity that operates the cluster of gateway nodes. In some instances, custom plugins are developed (e.g., built from "scratch") by developers or any user of the disclosed system. It can be appreciated that plugins, used in accordance with the disclosed technology, facilitate in centralizing one or more common functionalities that would be otherwise distributed across the APIs, making it harder to build, scale and maintain the APIs.

Other examples of plugins can be a security plugin, a monitoring and analytics plugin, and a transformation plugin. A security functionality can be associated with the system restricting access to an API by whitelisting or blacklisting/whitelisting one or more consumers identified, for example, in one or more Access Control Lists (ACLs). In some embodiments, the security plugin requires an authentication plugin to be enabled on an API. In some use cases, a request sent by a client can be transformed or altered before being sent to an API. A transformation plugin can apply a transformations functionality to alter the request sent by a client. In many use cases, a client might wish to monitor request and response data. A monitoring and analytics plugin can allow monitoring, visualizing, and inspecting APIs and microservices traffic.

In some embodiments, a plugin is Lua code that is executed during the life-cycle of a proxied request and response. Through plugins, functionalities of a gateway node can be extended to fit any custom need or integration challenge. For example, if a consumer of the disclosed system needs to integrate their API's user authentication with a third-party enterprise security system, it can be implemented in the form of a dedicated (custom) plugin that is run on every request targeting that given API. One advantage, among others, of the disclosed system is that the distributed cluster of gateway nodes is scalable by simply adding more nodes, implying that the system can handle virtually any load while keeping latency low.

One advantage of the disclosed system is that it is platform agnostic, which implies that the system can run anywhere. In one implementation, the distributed cluster can be deployed in multiple data centers of an organization. In some implementations, the distributed cluster can be deployed as multiple nodes in a cloud environment. In some implementations, the distributed cluster can be deployed as a hybrid setup involving physical and cloud computers. In some other implementations, the distributed cluster can be deployed as containers.

Figure 3A:
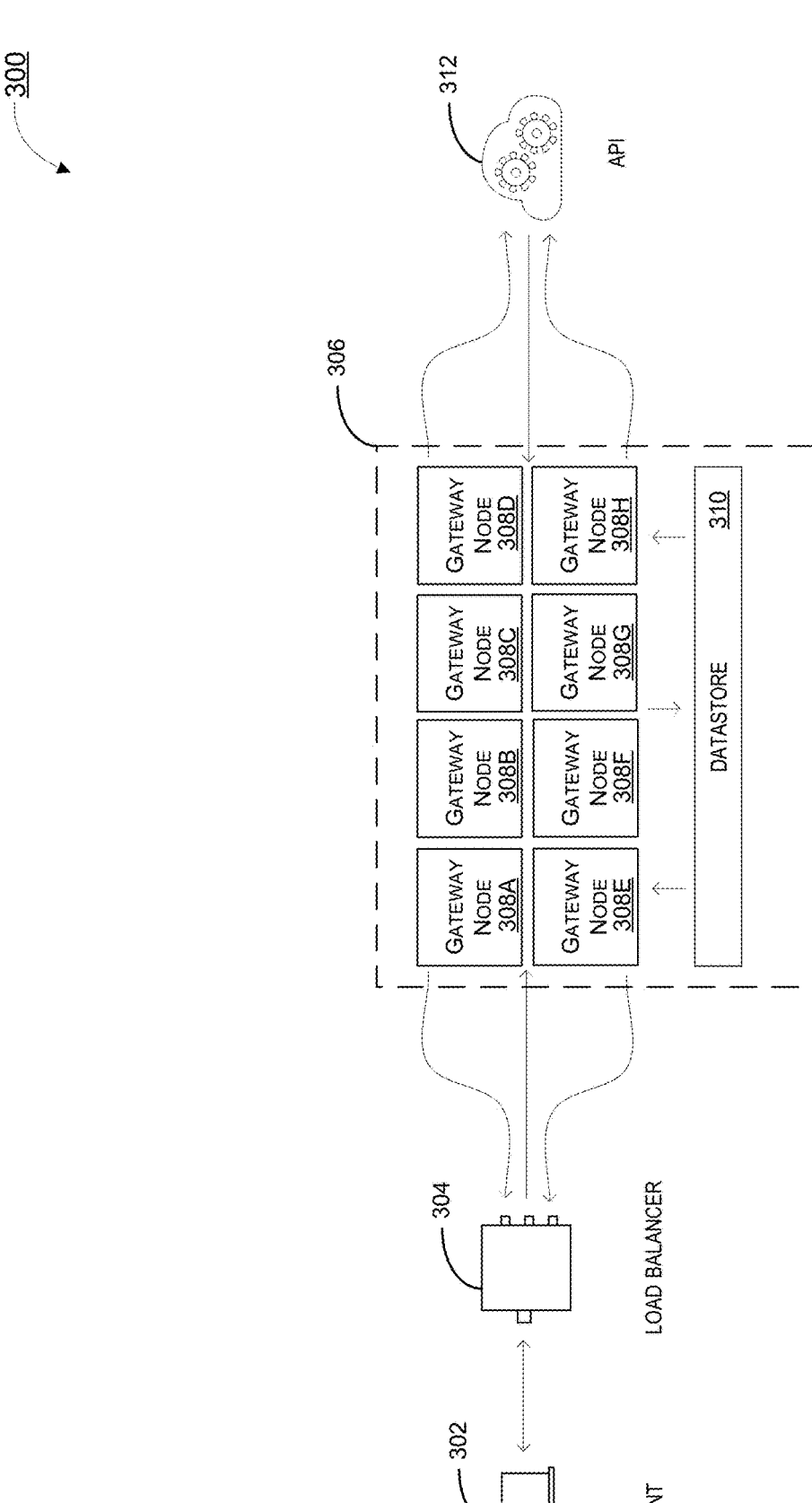
FIG. 3A illustrates a block diagram of an example environment with a cluster of gateway nodes in operation, according to an embodiment of the disclosed technology.

FIG. 3A illustrates a block diagram of an example environment with a cluster of gateway nodes in operation. In some embodiments, a gateway node is built on top of NGINX. NGINX is a high-performance, highly-scalable, highly-available web server, reverse proxy server, and web accelerator (combining the features of an HTTP load balancer, content cache, and other features). In an example deployment, a client 302 communicates with one or more APIs 312 via load balancer 304, and a cluster of gateway nodes 306. The cluster of gateway nodes 306 can be a distributed cluster. The cluster of gateway nodes 306 includes gateway nodes 308A—308H and data store 310. The functions represented by the gateway nodes 308A—308H and/or the data store 310 can be implemented individually or in any combination thereof, partially or wholly, in hardware, software, or a combination of hardware and software.

Load balancer 304 provides functionalities for load balancing requests to multiple backend services. In some embodiments, load balancer 304 can be an external load balancer. In some embodiments, the load balancer 304 can be a DNS-based load balancer. In some embodiments, the load balancer 304 can be a Kubernetes® load balancer integrated within the cluster of gateway nodes 306.

Data store 310 stores all the data, routing information, plugin configurations, etc. Examples of a data store can be Apache Cassandra or PostgreSQL. In accordance with disclosed embodiments, multiple gateway nodes in the cluster share the same data store, e.g., as shown in FIG. 3A. Because multiple gateway nodes in the cluster share the same data store, there is no requirement to associate a specific gateway node with the data store—data from each gateway node 308A-308H is stored in data store 310 and retrieved by the other nodes (e.g., even in complex multiple data center setups). In some embodiments, the data store shares configurations and software codes associated with a plugin that is installed at a gateway node. In some embodiments, the plugin configuration and code can be loaded at runtime.

Figure 3B:
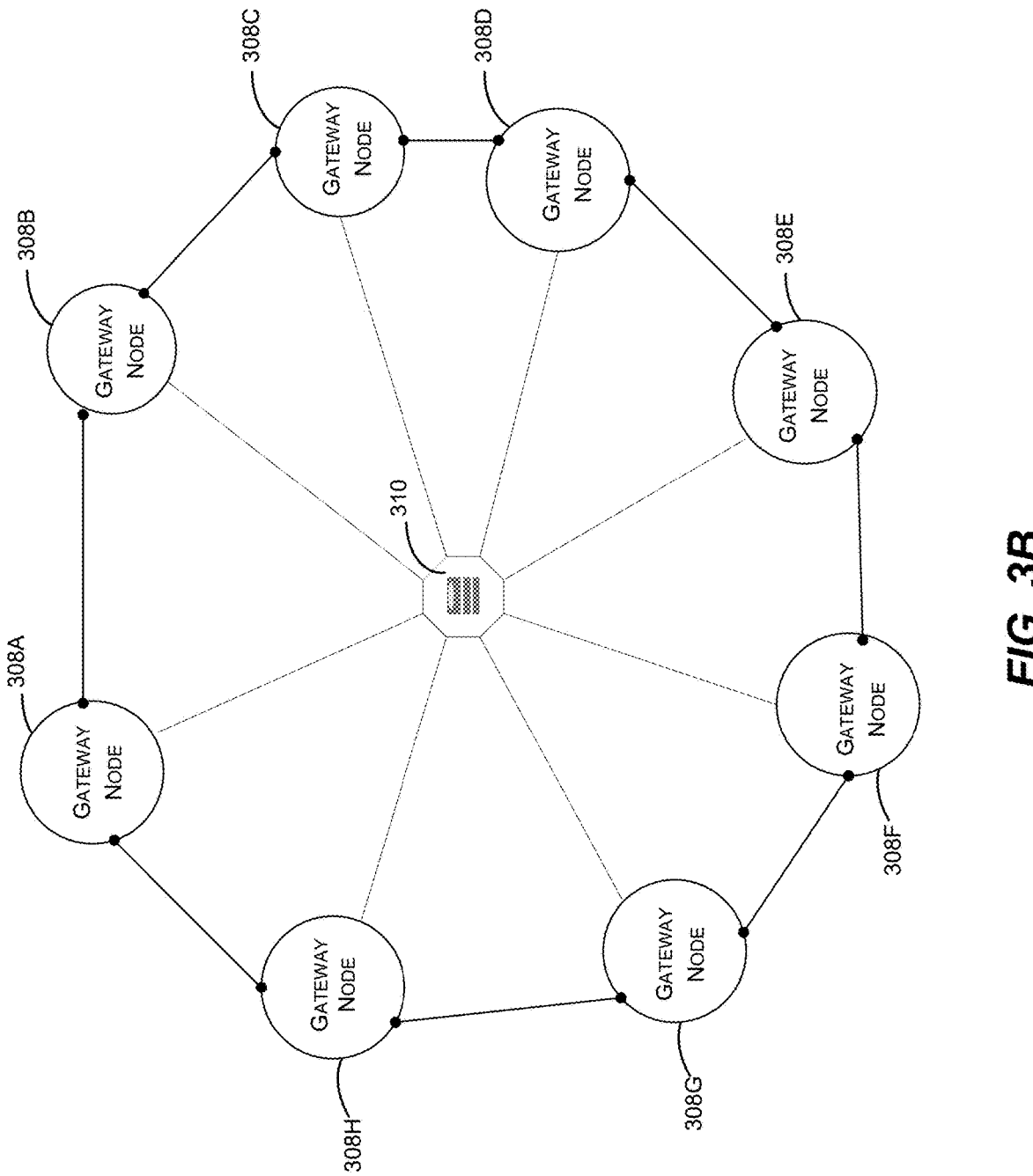
FIG. 3B illustrates a schematic of a data store shared by multiple gateway nodes, according to an embodiment of the disclosed technology.

FIG. 3B illustrates a schematic of a data store shared by multiple gateway nodes, according to an embodiment of the disclosed technology. For example, FIG. 3B shows data store 310 shared by gateway nodes 308A-308H arranged as part of a cluster.

One advantage of the disclosed architecture is that the cluster of gateway nodes allow the system to be scaled horizontally by adding more gateway nodes to encompass a bigger load of incoming API-related requests. Each of the gateway nodes share the same data since they point to the same data store. The cluster of gateway nodes can be created in one datacenter, or in multiple datacenters distributed across different geographical locations, in both cloud or on-premise environments. In some embodiments, gateway nodes (e.g., arranged according to a flat network topology) between the datacenters communicate over a Virtual Private Network (VPN) connection. The system can automatically handle a new gateway node joining a cluster or leaving a cluster. Once a gateway node communicates with another gateway node, it will automatically discover all the other gateway nodes due to an underlying gossip protocol.

In some embodiments, each gateway includes an administration API (e.g., internal RESTful API) for administration purposes. Requests to the administration API can be sent to any node in the cluster. The administration API can be a generic HTTP API. Upon set up, each gateway node is associated with a consumer port and an admin port that manages the API-related requests coming into the consumer port. For example, port number 8001 is the default port on which the administration API listens and 8444 is the default port for HTTPS (e.g., admin_listen_ssl) traffic to the administration API.

In some instances, the administration API can be used to provision plugins. After a plugin is installed at a gateway node, it is available to be used, e.g., by the administration API or a declarative configuration.

In some embodiments, the administration API identifies a status of a cluster based on a health state of each gateway node. For example, a gateway node can be in one of the following states:

active: the node is active and part of the cluster.
failed: the node is not reachable by the cluster.

leaving: a node is in the process of leaving the cluster.
left: the node has left the cluster.

In some embodiments, the administration API is an HTTP API available on each gateway node that allows the user to create, restore, update, and delete (CRUD) operations on items (e.g., plugins) stored in the data store. For example, the Adm in API can provision APIs on a gateway node, provision plugin configuration, create consumers, and provision their credentials. In some embodiments, the administration API can also read, update, or delete the data. Generally, the administration API can configure a gateway node and the data associated with the gateway node in the data store.

In some applications, it is possible that the data store only stores the configuration of a plugin and not the software code of the plugin. That is, for installing a plugin at a gateway node, the software code of the plugin is stored on that gateway node. This can result in efficiencies because the user needs to update his or her deployment scripts to include the new instructions that would install the plugin at every gateway node. The disclosed technology addresses this issue by storing both the plugin and the configuration of the plugin. By leveraging the administration API, each gateway node can not only configure the plugins, but also install them. Thus, one advantage of the disclosed system is that a user does not have to install plugins at every gateway node. But rather, the administration API associated with one of the gateway nodes automates the task of installing the plugins at gateway nodes by installing the plugin in the shared data store, such that every gateway node can retrieve the plugin code and execute the code for installing the plugins. Because the plugin code is also saved in the shared data store, the code is effectively shared across the gateway nodes by leveraging the data store, and does not have to be individually installed on every gateway node.

Example Routing Functionality of Gateways

Figure 4:
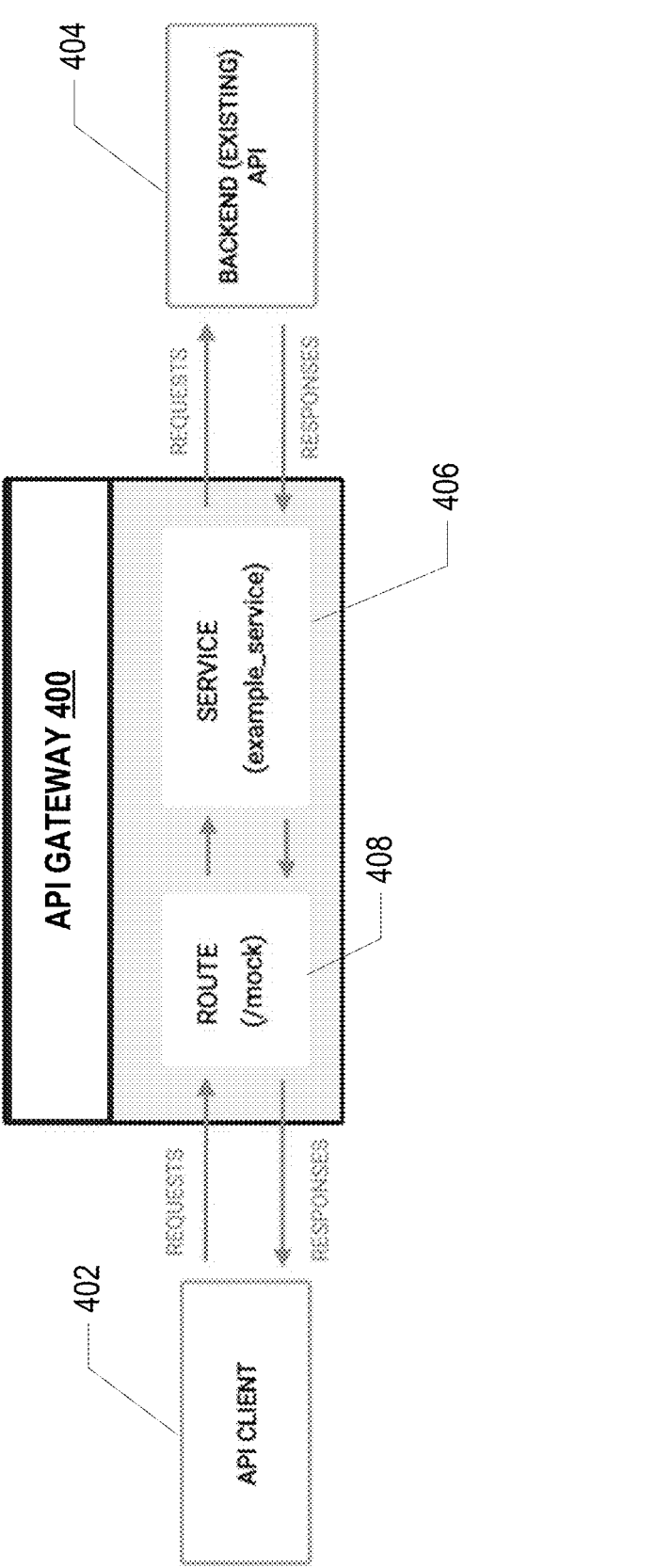
FIG. 4 illustrates a block diagram of an example gateway that routes API requests to and responses from services, according to an embodiment of the disclosed technology.

FIG. 4 illustrates a diagram that describes example routing functionality of an API gateway 400. In some embodiments, the API gateway 400 illustrated in FIG. 4 includes one or more gateway nodes and is implemented by one or more computing systems (e.g., one or more of the computer system 700 illustrated in and described below with FIG. 7). As illustrated, the API gateway 400 generally exists as an intermediary node between an API client 402 and an API 404. That is, the API gateway 400 is generally configured to sit between API clients and backend services or APIs, and the API gateway 400 acts as a proxy that accepts API requests, collects response data from the appropriate backend services or APIs, and returns an API response. Thus, with the API gateway 400, API clients 402 do not directly interface with the backend services or APIs 404.

According to example implementations, API clients 402 invoke and receive data from APIs 404 that are obscured to the API clients 402 behind the API gateway 400. In particular, API clients 402 target services 406 that are exposed points provided by the API gateway 400. These services 406 are representations of the APIs 404. Accordingly, as part of the representation and abstraction provided by the services 406, the API gateway 400 is configured to identify messages addressed for a service 406 and to route the messages to the API 404 represented by the service 406. This routing functionality of the API gateway 400 is controlled by routes 408 defined for the service 406 and/or the API 404. As indicated in FIG. 4, the API gateway 400 is configured to apply routing for client requests to services/APIs and for responses from services/APIs to API clients 402.

Thus, a service 406 is a data entity that represents and abstracts an upstream API or microservice. For example, a service 406 represents a data transformation microservice, a billing API, and/or the like. In some embodiments, the main attribute of a service is a uniform resource locator (URL) that is specified by a single string (e.g., example_service in the illustrated example), or by a protocol, host, port, and path individually.

The representation and abstraction of APIs 404 as services 406 that are exposed at the API gateway 400 provides technical benefits. Since the API client 402 calls the service 406 (instead of the API 404 directly), changes to the API 404 represented by the service 406 (e.g., versioning, updating) do not impact how the API clients 402 generally invoke and receive data from the API 404. That is, the API clients 402 continue to target the service 406, and changes to the API 404 only need to propagate to backend mappings between services 406 and APIs 404.

Routes 408 enable an additional layer of control and security over the representation and abstraction provided by services 406. In example embodiments, implementation of routes 408 with services 406 (and the separation of concerns between them) offers a powerful routing mechanism that enables definition of fine-grained entry-points in the API gateway 400 that lead to different upstream APIs 404 and services. The API gateway 400 takes requests from API clients 402 and passes the requests to the appropriate upstream API based on the configuration of routes 408. In some examples, the requests are received on a data plane or an API message layer (e.g., an application layer, Layer 7). For example, the API gateway 400 decrypts, combines, filters, processes, parses, and/or the like data packets in order to form API messages and message data for routing.

In particular, while services 406 act as abstracted endpoints that represent corresponding APIs, routes 408 represent different ways that a client request reaches a service 406 and upstream API. Routes 408 allow the same service to be used by multiple API clients and apply different policies based on the route used by each API client.

The following example demonstrates the technical benefits realized from the implementation of routes 408. In the example, both an external API client and an internal API client need to access a particular service, but the external API client needs to be limited in how often the external API client is able to query the service to assure no denial-of-service attacks. If a rate limit policy is configured for the service 406 itself, the internal API client is limited as well when the internal API client calls the service.

The routes 408 address this technical challenge. In the example above, two routes can be created (e.g., /external and/internal), and both routes point to the particular service. A policy can be configured to limit how often the/external route is used and the route can be communicated to the external client for use. When the external client tries to access the service via the gateway using the/external route, the external client is rate limited. The policy is configured to be route-specific, such that when the internal client accesses the service via the API gateway 400 using the /internal route, the internal client is not limited. Thus, routes 408 represent different interactions with a service 406 by multiple clients, in some examples, and enables different controls to be discriminatively or selectively realized for the same service.

The above-described example provides an example of an authorization or security policy that can be differentially applied using routes. According to example embodiments, routes are similarly associated with and used for applying authentication policies, other security policies, geolocation policies, IP-specific policies, and/or the like. For example, with geolocation policies across different routes, API messages addressed to or received from clients located in a first location are routed differently than API messages addressed to or received from clients located in a second location. As another example, geolocation policies control routing based on a location of upstream APIs, or a relative distance between upstream APIs and clients. As another example, with IP-specific policies across different routes, API messages address to or received from a first group of clients (identified by IP addresses) are routed differently than API messages addressed to or received from a second group of clients. In some embodiments, a given policy maps different policy actions to different routes, with the different routes being identified by unique identifiers.

According to example embodiments, routes 408 and services 406 are defined by data objects managed and stored by the API gateway 400. For example, a service data object that defines a service 406 includes a name (e.g., example_service) and upstream API connection information. In some examples, the connection information is provided as a single string representing a URL or as multiple individual values for protocol, host, port, and path. In some embodiments, services 406 have a one-to-many relationship with upstream APIs 404, which enables creation and application of sophisticated traffic management behaviors.

According to example embodiments, routing data objects are definitions of routes 408. In particular, routing data objects include rules by which client requests are matched to a route. For a given route defined by a routing data object that includes matching rules, a client request is handled according the given route if the client request satisfies the matching rules. Each routing data object is associated with a service, and in some examples, a service has multiple routing data objects associated with it. In some examples, a routing data object is associated with a service based on including a unique identifier for the service. The API gateway 400 proxies every request that matches the routing data object to the service associated with (e.g., indicated by) the routing data object.

In some embodiments, the routing data object includes a unique identifier (e.g., a name string, an incremented value, a hash value, a globally unique identifier, a universally unique identifier). The unique identifier for routing data objects are used to map the routing data objects to different policy actions.

Embodiments disclosed herein provide an API routing domain-specific programming language, or a routing domain-specific language (DSL), that provides expressive definition, configuration, and interpretation of routing data objects. In particular, the routing DSL enables a routing data object to include and combine multiple complex matching rules for a more light-weight library of routing data objects. Due to the expressive nature of the routing DSL, the API gateway 400 is able to improve runtime performance of matching operations with routing data objects and determine how to route a given API request. Thus, various technical benefits are provided by embodiments disclosed herein.

In some embodiments, a routing data object includes a name, one or more paths, and a reference to an existing service. Routing data objects define matching rules with respect to attributes, parameters, characteristics, properties, and/or the like of API requests and responses. For example, a routing data object includes complex matching rules for each of protocols, hosts, methods, headers, redirect status codes (e.g., HTTPS status codes), tags (e.g., optional strings for route groupings), and/or the like of API messages.

According to example embodiments, the matching rules are configured as a match expression included in each routing data object. In some embodiments, a routing data object configured according to the routing DSL includes one match expression. For the one match expression to accurately capture multiple matching rules, the match expression includes logical combinations of individual statements that each define a matching rule. Examples of such match expressions are included throughout and described in detail below.

According to example embodiments, authorized users (e.g., administrative users) configure or define routing data objects that are used by the API gateway 400. In some embodiments, the users cause generation of a routing data object based on transmitting an administrative request to the API gateway 400. In some embodiments, the routing data objects are generated in a data store accessible by the API gateway 400 (e.g., data store 310 illustrated in FIGS. 3A and 3B).

In some embodiments, a routing data object that is associated with a specific service is created by the API gateway 400 based on the API gateway 400 receiving a request that identifies the specific service. In some examples, the request is a HTTP POST request to the URL of the specific service. In some examples the request is made to an administrative service or an administrative API, and the request includes the match expression for the routing data object.

FIG. 5A illustrates an example of a request for causing creation of a routing data object (e.g., a HTTP POST request). In the illustrated example, the request is addressed to a URL of a specific service to which the created routing data object will point. In the illustrated example, the request includes the match expression to be used by the created routing data object. In particular, the match expression includes a matching rule http.path="/mock", generally indicating that API requests having a request path of /mock will be matched with the created routing data object. This match expression results in said API requests being routed to the service example_service under which the routing data object is created.

FIG. 5B illustrates another example of a request to create a routing data object (e.g., a HTTP POST request). As discussed above, the routing DSL enables match expressions to be defined with complexity and to include multiple conditions. In the illustrated example, the request includes a match expression that includes logical combinations of a total of eleven different conditions by which API requests are matched to the created routing data object.

Definition of such complex match expressions enables improved storage efficiency of routing data objects. For example, instead of a routing data object including multiple fields and sub-fields with match values in each field and sub-field, the routing data object includes one match expression. Further, definition of complex match expressions enables improved runtime performance. Depending on the logical combination of rules represented in the match expression, only a portion of the match expression is evaluated to determine a logical output describing whether a given API request matches the routing data object.

In response to the request, for creating a routing data object, a response is provided by the specific service or the administrative service via the API gateway 400. For example, a success response code and parameters or conditions of the created routing data object are provided by the API gateway 400 back to the user.

Beyond user creation of routing data objects, the API gateway 400 provides other administrative functionality relating to routes and routing data objects. In some embodiments, the API gateway 400 enables an authorized user (e.g., an administrator) to view a specific routing data object. When created, routing data objects are assigned with a unique identifier (e.g., an incrementing number, a globally unique identifier, a universally unique identifier, a universal resource identifier or locator, a name string). As such, an authorized user is able to make a request that include the unique identifier for a specific routing data object to view the routing data object. In some examples, the authorized user makes a HTTP GET request to the URL of a specific routing data object, and the API gateway 400 indicates (e.g., causes display at the user client) the match expression of the specific routing data object.

In some embodiments, an authorized user is able to view a listing of all routing data objects (or respective match expressions), routing data objects for a specific service, and/or the like.

Another administrative functionality relating to routes and routing data objects includes modification and updating of routing data objects. In some embodiments, routing data objects are updated dynamically in response to user requests (e.g., from a client to the API gateway 400). In some examples, the client transmits a HTTP PATCH request to a URL assigned to the routing data object, and the HTTP PATCH request includes a new match expression for the routing data object. In response, the routing data object is updated (e.g., by the API gateway 400, by an administrative API or application) to include the new match expression. In some embodiments, a routing data object is modified or updated to include one or more tags that enable grouping or filtering of routing data objects.

In some embodiments, the API gateway 400 is associated with configuration data or metadata, such as a configuration YAML file. In some embodiments, the configuration data is used to configured individual properties of an instance of the gateway. In some embodiments, the configuration data includes a parameter that controls whether routing data objects are configured with one match expression or are configured with multiple individual fields corresponding to attributes of API requests. In response to the parameter having a particular value, the API gateway 400 is configured to define and interpret routing data objects according to the routing DSL. Thus, in some embodiments, use and compatibility of the routing DSL is controlled by gateway configuration.

As discussed, the API gateway 400 uses the routing data objects based on evaluating a received API message (e.g., an API request from a client, an API response from an upstream API or service) with respect to the match expressions of the routing data objects. In particular, the evaluation, or match operation, is performed to identify a particular routing data object to which the API message matches. The API gateway 400 then routes the API message according to the route represented by the particular routing data object.

In some embodiments, routing data objects are associated with or include a priority value. Routing data objects are evaluated in order of priority value, for example, where the highest integer of priority value is evaluated first. If two routes have the same priority, then the newest route will be evaluated first. In some examples, recency of creation of routing data objects is represented by a variable or parameter (e.g., created_at) within each routing data object.

Thus, in some embodiments, the gateway is configured to sort and order routing data objects for evaluation. In some embodiments, the gateway evaluates routing data objects sequentially until a match is found.

With sequential evaluation of routing data objects, worst case match time scales linearly as the number of routing data objects increase. Therefore, it is desirable to reduce a number of unique routes by leveraging the expressiveness and combination capabilities of the routing DSL when generating routing data objects.

For example, if multiple routing data objects result in the same service and plug-in config being used, the multiple routing data objects are combinable into a single routing data object. In particular, respective match expressions included in each of the multiple routing data objects are combinable by a logical OR operator to form a single match expression for a single routing data object. In some embodiments, the API gateway 400 is configured to identify combinable routing data objects and to recommend and/or automatically cause combination of the combinable routing data objects. As such, a number of routing data objects that are evaluated by the gateway is minimized, which improves matching performance at runtime.

Example Features of the Routing DSL

As discussed above, example embodiments relate to an API routing domain-specific programming language, or a routing DSL, that enables improved runtime performance and efficiency, compact memory usage and allocation, and user versatility. In particular, the routing DSL enables definition of routes as combinations of one or more matching rules, each defined as an attribute condition statement. Each attribute condition statement is further flexible in defining relational comparisons as matching rules. As such, with one or more attribute condition statements being logically combined and each attribute condition statement being capable of relational comparison, fewer routing data object are needed to fully define all routing possibilities, for example.

Generally, an attribute condition statement according to the routing DSL follows one or more pre-defined forms or structures. In some embodiments, the form of an attribute condition statement is one of [attribute|operator|value] or [transformation(attribute)|operator|value].

In the former form of an attribute condition statement, a specified attribute of a given API request is compared against the data value. The nature of the comparison is specified by the operator. Possible operators for an attribute condition statement include inequality operators, partial-matching operators, contains operators, and/or the like. Thus, according to example embodiments, attribute condition statements in the routing DSL are not limited to exact matching.

In the latter form of an attribute condition statement, the specified attribute of a given API request is transformed before and for the comparison against the data value. By including a transformation function, variations of how an attribute is specified within the given API request are captured. For example, an example transformation function is a lower( ) transformation that forces an attribute of a given API request to be lowercase. In some embodiments, the transformation function works only on attributes on the left-hand side of the attribute condition statement. For example, according to example embodiments of the routing DSL, a form [attribute|operator|transformation(value)] would be improper. This constraint promotes clarity in defining and interpreting attribute condition statements. Given a lower( ) transformation function applied on a data value, for example, the data value could already be specified in lowercase. Insufficient definition of a data value in an attribute condition statement followed by reliance on a transformation function to further define the data value is improper and leads to performance losses.

Attribute condition statements are grouped with parenthesis and/or logical operators to form a match expression. A match expression according to the routing DSL includes one or more attribute condition statements, thereby promoting compact definition and efficient evaluation of routes by a gateway. For example, rather than two individual routing data objects defining attribute condition statements, [net.port==80] and [https.method==GET] respectively, the two attribute condition statements are defined as one match expression in one routing data object: [net.port==80]|| [https.method==GET]. In some embodiments, the logical operators for combining or grouping attribute condition statements are Boolean operators, causing one match expression to have one logical output that is based on a logical combination of logical outputs of individual attribute condition statements. Parenthesis are used to prioritize portions of a logical combination, according to the understood meaning of parenthesis.

In some embodiments, the routing DSL is strongly typed. For example, a certain attribute is only permitted to be specified with certain relational operators that are specific to a data type of the certain attribute. For example, only string comparison operators are permitted to be used with attributes of a string data type, while only numerical comparison operators are permitted to be used with attributes of a numerical data type (e.g., int, float, double). In some embodiments, the gateway is configured with pre-defined knowledge of type-specificity of operators and is configured to return errors if a given attribute condition statement includes type inconsistencies.

Table 1 lists example attributes defined for the DSL, as well as the data type associated with each attribute.

TABLE 1

| Attribute | Description | Type |
|---|---|---|
| net.protocol | The protocol used to communicate with the upstream application | String |
| net.port | Server end port number | Int |
| tls.sni | Server name indication | String |
| http.method | http methods/verbs that match a route | String |
| http.host | List of domains that match a route | String |
| http.path | Normalized request path (without query parameters) | String |
| http.headers.header-name | Value of header-name. Header names are converted to lower case, and - are replaced to _. | String |

Table 2 lists relational operators specific to the string data type. As indicated, string operators include equality operators, inequality operators, partial matching operators, regex matching operators, and contain operators.

TABLE 2

| Operator | Meaning |
|---|---|
| == | Equals |
| != | No equals |
| ~ | Regex matching |
| ^= | Prefix matching |
| =^ | Suffix matching |
| In | Contains |
| Not in | Does not contain |

In some embodiments, attribute condition statements that involve partial matching (e.g., ^= or =^) are preferable over attribute condition statements that involve Regex (regular expression) matching. Regular expressions are more expensive to build and execute for evaluation. Further, regular expressions are not optimized easily, compared to the other operators provided by the routing DSL. In some embodiments, when the Regex-matching operator is detected by the gateway (e.g., when receiving a request to generate a routing data object), the gateway is configured to return a recommendation to replace, reconfigure, or remove the Regex-matching operator and/or the attribute condition statement.

Table 3 lists relational operators specific to the integer type. With integers, operators include equality operators and inequality operators (e.g., strict, unstrict).

TABLE 3

| Operator | Meaning |
| --- | --- |
| == | Equals |
| != | Not equals |
| > | Greater than |
| >= | Greater than or equal |
| < | Less than |
| <= | Less than or equal |

In some embodiments, transformations are also type-specific. Table 4 lists example transformations specific to certain data types.

TABLE 4

| Transformation | Meaning |
| --- | --- |
| lower( ) | Lowercase for string data type |
| increment( ) | Increase by one for numerical data type |

As discussed above, combinatorial operators are used for combining two or more attribute condition statements to form a match expression. Table 5 lists operators for combining attribute condition statements. For example, the combinatorial operators include Boolean operators.

TABLE 5

| Operator | Meaning |
| --- | --- |
| && | Logical and |
| \|\| | Logical or |

Thus, according to example embodiments, a gateway or router is configured to define and interpret routing data objects in accordance with various features of the routing DSL. For example, a router is configured to execute instructions for interpreting the routing DSL, and the instructions when executed cause the router to interpret aspects of the routing DSL.

In some embodiments, aspects of the routing DSL include a set of attributes (e.g., net.port, https.method) that are each indicated by a particular data string, and the attributes describe parameters or characteristics of API requests received at the router.

In some embodiments, aspects of the routing DSL include a set of relational operators that each define a comparison between a given attribute and a given data value. The relational operators are type-specific. Example relational operators include==, >=(for numbers), ^=(for strings), and/or the like including those listed above.

In some embodiments, aspects of the routing DSL include an attribute condition statement, or pre-defined forms or structures thereof. For example, an attribute condition statement is composed of an attribute, a relational operator, and a data value against which the attribute is compared according to the relational operator. For example, an attribute condition statement follows the form of [attribute|operator-|value]. In some examples, an attribute condition statement further includes a transformation function that modifies the attribute.

In some embodiments, aspects of the routing DSL include a set of combinatorial operators each configured to logically combine two (or more) attribute condition statements to form a match expression that results in one logical output. For example, the combinatorial operators include Boolean operators, parenthesis, and/or the like.

Example Operations for Implementing the Routing DSL

Figure 6:
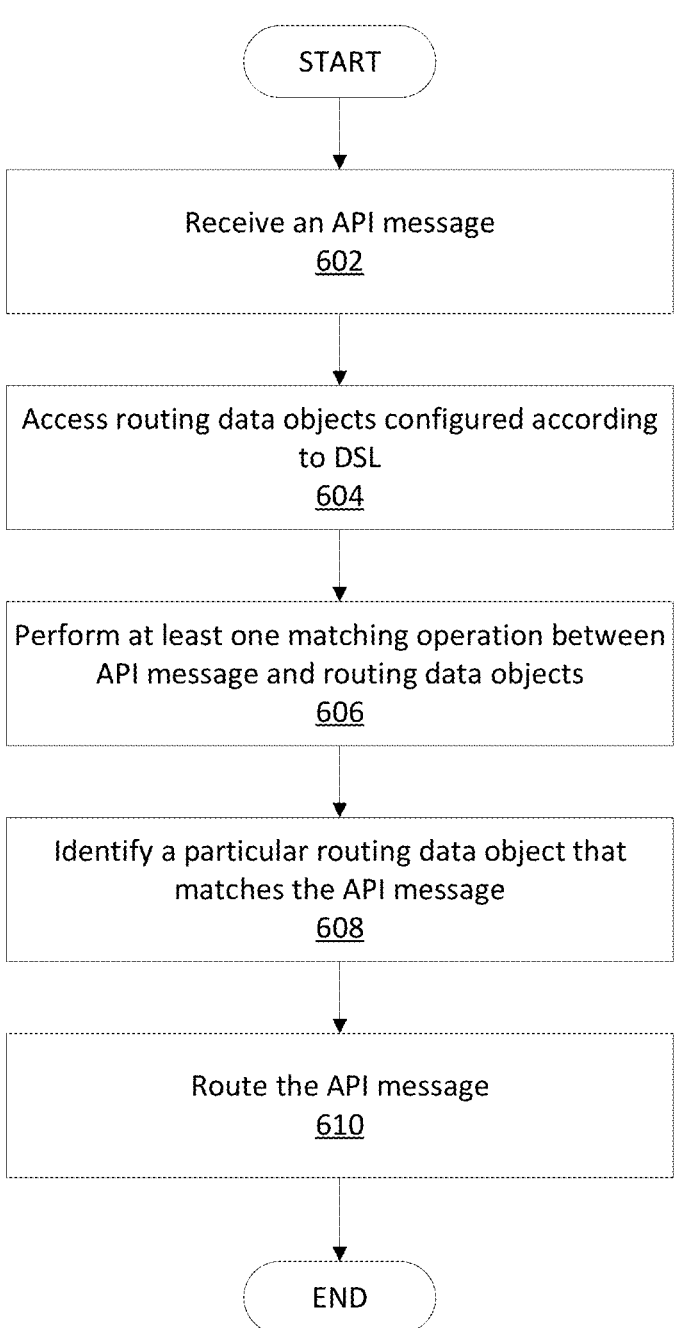
FIG. 6 illustrates a flow diagram showing example operations for implementing and interpreting a routing domain-specific language for API requests (and responses), according to an embodiment of the disclosed technology.

FIG. 6 is a flowchart illustrating a method of routing API messages (e.g., API requests, API responses) within a microservices architecture. In some embodiments, the method is performed by an API gateway, an API gateway device, a router, an API router, an API routing device, and/or the like. Example operations of the method are described herein as being performed by an API gateway, according to example embodiments. For example, the API gateway performing the example operations of the method includes one or more gateway nodes (e.g., gateway node 106 shown in FIG. 1B, gateway node 206 shown in FIG. 2, one or more gateway nodes 308 shown in FIGS. 3A-3B, API gateway 400 shown in FIG. 4). In another example, the API gateway performing the example operations of the method is a non-distributed gateway.

At 602, the API gateway receives an API message that includes a plurality of attributes. For example, the plurality of attributes include one or more of the attributes indicated in Table 1. In some embodiments, the gateway extracts the plurality of attributes from the API request. In some embodiments, the API gateway receives the API message at an API message layer or a data plane. For example, the API gateway receives a plurality of data packets and decrypts, aggregates, processes, and/or the like the data packets to form an API message.

At 604, the API gateway accesses a plurality of routing data objects, for example, stored in a data store accessible by the gateway. The routing data objects are configured according to the routing DSL. For example, the routing data objects include match expressions that include a logical combination of one or more attribute condition statements. Each routing data object is associated with an upstream API and includes a match expression. The match expression includes a logical combination of one or more attribute condition statements. Each attribute condition statement is specific to an attribute of API messages. Each attribute condition statement is defined by a data value and a relational operator by which the attribute is compared to the data value.

At 606, the API gateway performs at least one matching operation between the API message and the plurality of routing data objects. In some embodiments, the gateway sequentially performs one or more matching operation each between the API message and one of the plurality of routing data objects. Each matching operation for a given one of the plurality of routing data objects includes evaluating, with the attributes of the API message, the one or more attribute condition statements of the match expression of the given routing data object. Each matching operation further includes determining whether the match expression is logically true according to the logical combination of the attribute condition statements defined in the match expression.

At 608, the API gateway identifies a particular routing data object based on the at least one matching operation. The particular routing data object matches the API message based on the match expression being evaluated as logically true with the attributes of the API message.

At 610, the API gateway routes the API message according to the particular routing data object. For example, based on the API message being an API request, the gateway routes the API message to the service and/or upstream API associated with the particular routing data object. In some embodiments, the gateway routes the API message according to various policies associated with the particular routing data object. For example, the particular routing data object is associated with a particular rate-limiting policy, and routing of the API message is delayed or prohibited. As another example, the particular routing data object is associated with a particular authentication policy, and an authentication token included in the API message is verified according to the policy before the API message is routed. In some embodiments, the policies associated with the particular routing data object include one or more of a rate-limiting policy, an authentication or security policy, a geolocation policy, an IP-specific or address-specific policy, and/or the like.

Exemplary Computer System

FIG. 7 shows a diagrammatic representation of a machine in the example form of a computer system 700, within which a set of instructions for causing the machine to perform any one or more of the methodologies discussed herein may be executed. As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computer system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 700. In some implementation, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The network interface device 712 enables the computer system 700 to mediate data in a network 714 with an entity that is external to the computer system 700 through any communication protocol supported by the computer system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computer system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices [#]10, removable flash memory, hard disk drives, optical disks, and transmission-type media such as digital and analog communication links.

In alternative embodiments, the machine operates as a standalone device or may be connected (networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone or smart phone, a tablet computer, a personal computer, a web appliance, a point-of-sale device, a network router, switch or bridge, or any machine capable of executing a set of instructions (sequential or otherwise) that specify actions to be taken by that machine.

While the machine-readable (storage) medium is shown in an exemplary embodiment to be a single medium, the term "machine-readable (storage) medium" should be taken to include a single medium or multiple media (a centralized or distributed database, and/or associated caches and servers) that store the one or more sets of instructions. The term "machine-readable medium" or "machine readable storage medium" shall also be taken to include any medium that is capable of storing, encoding or carrying a set of instructions for execution by the machine and that cause the machine to perform any one or more of the methodologies of the present invention.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include, but are not limited to, recordable type media such as volatile and non-volatile memory devices, floppy and other removable disks, hard disk drives, optical disks (e.g., Compact Disk Read-Only Memory (CD ROMS), Digital Versatile Discs, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

All patents, applications and references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, Applicant contemplates the various aspects of the disclosure in any number of claim forms. For example, while only one aspect of the disclosure is recited as a means-plus-function claim, other aspects may likewise be embodied as a means-plus-function claim, or in other forms, such as being embodied in a computer-readable medium. (Any claims intended to be treated under 35 U.S.C. § 112(f) will begin with the words "means for.") Accordingly, the applicant reserves the right to add additional claims after filing the application to pursue such additional claim forms for other aspects of the disclosure.

What is claimed is:

1. A method for routing application programming interface (API) requests within a microservices architecture, the method comprising:

receiving an API request that includes a plurality of message attributes;

accessing a plurality of routing data objects according to a domain-specific programming language, each routing data object being associated with an upstream API of the microservices architecture and including a match expression, wherein the match expression includes a logical combination of one or more attribute condition statements using one or more Boolean operators, wherein evaluation of the match expression produces a single output indicating whether the API request matches the routing data object, wherein each attribute condition statement is specific to a message attribute and is defined by a data value and a relational operator by which the message attribute is compared to the data value, and wherein the relational operator of each attribute condition statement is one of a set of operators that is specific to a data type of the message attribute;

performing at least one matching operation between the API request and the plurality of routing data objects, wherein each matching operation for a given one of the plurality of routing data objects includes:

evaluating, with the plurality of message attributes of the API request, the one or more attribute condition statements of the match expression of the given one of the plurality of routing data objects, and determining whether the match expression is logically true according to the logical combination of the one or more attribute condition statements;

based on performing the at least one matching operation, identifying a particular routing data object that matches the API request based on the match expression of the particular routing data object being logically true with the plurality of message attributes of the API request; and routing the API request to a particular upstream API according to the particular routing data object.

2. The method of claim 1, wherein the at least one matching operation includes multiple matching operations that are performed sequentially according to a priority value associated with each routing data object of the plurality of routing data objects.

3. The method of claim 2, wherein the multiple matching operations are performed sequentially further according to a time at which each routing data object was defined.

4. The method of claim 1, wherein the relational operator of each attribute condition statement is one of a set of operators that is specific to a data type of the message attribute to which the attribute condition statement is specific.

5. The method of claim 4, wherein based on the data type being a string data type, the set of operators includes an equality operator, an inequality operator, a partial-matching operator, a contains operator, and a Regex-matching operator.

6. The method of claim 4, wherein based on the data type being a numerical data type, the relational operator is either an equality operator or an inequality operator.

7. The method of claim 1, further comprising reducing a number of routing data objects included in the plurality of routing data objects based on:

determining that two routing data objects of the plurality of routing data objects are combinable, and defining a combined routing data object to replace the two routing data objects, wherein the combined routing data object includes a combined match expression that includes a logical combination, via an OR Boolean operator, of respective match expressions of the two routing data objects.

8. The method of claim 7, wherein the two routing data objects are combinable based on the two routing data objects being associated with a same upstream application.

9. An API router comprising:

at least one data processor; and a memory storing instructions that, when executed by the at least one data processor, cause the API router to:

define, for each of a plurality of services, one or more routing data objects according to a domain-specific programming language, each including a match expression that is a logical combination of one or more attribute condition statements using one or more Boolean operators, wherein evaluation of the match expression produces a single output indicating whether a given API message matches the one or more routing data objects, wherein each attribute condition statement is specific to a message attribute and includes a data value and a relational operator by the message attribute is compared to the data value, and wherein the relational operator of each attribute condition statement is one of a set of operators that is specific to a data type of the message attribute;

perform at least one matching operation between a first API message and a plurality of routing data objects, wherein each matching operation for a given one of the plurality of routing data objects includes:

evaluating, with the message attributes of the first API message, the one or more attribute condition statements of the match expression of the given one of the plurality of routing data objects, and determining whether the match expression is logically true according to the logical combination of the one or more attribute condition statements;

based on performing the at least one matching operation, identify a particular routing data object that matches the first API message based on the match expression of the particular routing data object being logically true with the message attributes of the first API message; and route the given API message according to one or more policies associated with the particular routing data object.

10. The API router of claim 9, wherein identifying the particular routing data object includes sequentially performing at least one matching operation between the given API message and one of a group of routing data objects.

11. The API router of claim 10, wherein the at least one matching operation includes multiple matching operations that are sequentially performed according to a priority value associated with each routing data object.

12. The API router of claim 9, wherein the relational operator of each attribute condition statement is one of a set of operators that is specific to a data type associated with the attribute condition statement.

13. The API router of claim 9, wherein an attribute condition statement further includes a transformation function that transforms the attribute compared to the data value.

14. The API router of claim 9, wherein defining the one or more routing data objects includes defining a combined routing data object from two routing data objects, the combined routing data object including a combined match expression that combines respective match expressions of the two routing data objects via an OR Boolean operator.

15. A platform implemented by a computing system comprising:

at least one processor; and at least one memory including instructions that when executed cause the at least one processor to execute:

a plurality of services; and an API gateway configured to route API messages to or from the plurality of services, the API gateway configured to:

store, in the at least one memory, a plurality of routing data objects each associated with one of the plurality of services according to a domain-specific programming language, wherein each routing data object includes a match expression that logically combines one or more attribute condition statements using one or more Boolean operators, wherein evaluation of the match expression produces a single output indicating whether a given API message matches the one or more routing data objects, wherein each attribute condition statement is specific to a message attribute and includes a data value and a relational operator by which the message attribute is compared to the data value, and wherein the relational operator of each attribute condition statement is one of a set of operators that is specific to a data type of the message attribute, perform at least one matching operation between the given API message and the plurality of routing data objects, wherein each matching operation for a given one of the plurality of routing data objects includes:

evaluating, with the message attributes of the given API message, the one or more attribute condition statements of the match expression of the given one of the plurality of routing data objects, and determining whether the match expression is logically true according to the logical combination of the one or more attribute condition statements, based on performing the at least one matching operation, identify a particular routing data object that matches the given API message based on the match expression of the particular routing data object being logically true with the message attributes of the given API message, route the given API message to or from a particular service according to the particular routing data object.

16. The platform of claim 15, wherein the API gateway matches the given API message to the particular routing data object by sequentially performing multiple matching operations between the given API message and one of the plurality of routing data objects.

17. The platform of claim 15, wherein the relational operator of each attribute condition statement is one of a set of operators that is specific to a data type of the data value of the attribute condition statement.

18. The platform of claim 15, wherein the API gateway routes the given API message according to one or more policies associated with the particular routing data object, wherein the one or more policies include one or more of a rate-limiting policy, an authentication or security policy, a geolocation policy, or an IP-specific policy.

19. The platform of claim 15, wherein the API gateway stores the plurality of routing data objects by optimizing the plurality of routing data objects by combining two routing data objects that correspond to a same service, wherein the two routing data objects are combined via a combined match expression that combines, with an OR Boolean operator, each match expression of the two routing data objects.

20. The platform of claim 15, wherein the API gateway is configured to store a given routing data object in response to receiving a particular API request for an administrative service, the particular API request defining the match expression for the given routing data object.

21. A router configured to execute instructions for interpreting a domain-specific programming language, the router comprising:

at least one processor; and at least one memory including the instructions, wherein the instructions when executed cause the router to interpret aspects of the domain-specific programming language including:

a set of attributes each indicated by a particular data string and each relating to an aspect of API messages received at the router;

a set of relational operators that each define a comparison between a given attribute and a given data value, wherein each relational operator is one of a set of operators that is specific to a data type of the given attribute;

an attribute condition statement composed of an attribute, a relational operator, and a data value against which the attribute is compared according to the relational operator; and execution of matching operations between a given API message and a plurality of routing data objects, wherein each matching operation for a given one of the plurality of routing data objects includes:

evaluating, with the message attributes of the given API message, the attribute condition statement of a match expression of the given one of the plurality of routing data objects, and determining whether the match expression is logically true according to a logical combination of the attribute condition statement, based on the execution of matching operations, the router identifies a particular routing data object that matches the given API message based on the match expression of the particular routing data object being logically true with the message attributes of the given API message;

a set of combinatorial operators each configured to logically combine two attribute condition statements to form a match expression that results in one logical output indicating whether an API message matches a routing data object.

22. The router of claim 21, wherein the instructions when executed further cause the router to:

in response to receiving a request to create a routing data object in accordance with the domain-specific programming language, determine whether, in a given attribute condition statement included in the request, a given relational operator is associated with a same data type as a given attribute; and based on the given relational operator being associated with a different data type than the given attribute, indicating an error code in response to the request.

23. The router of claim 21, wherein the instructions when executed further cause the router to:

in response to receiving a request to create a routing data object in accordance with the domain-specific programming language, determine whether a given attribute condition statement included in the request satisfies a pre-defined form; and based on the given attribute condition statement not satisfying the pre-defined form, indicating an error code in response to the request.

24. The router of claim 23, wherein the pre-defined form is attribute operator value.

* * * * *